United States Patent [19]
Gregory

[11] 3,857,096
[45] Dec. 24, 1974

[54] ELECTRICAL CURRENT LEAKAGE DETECTOR

[76] Inventor: Lawrence A. Gregory, 1785 Glenview Ave., St. Paul, Minn. 55112

[22] Filed: Apr. 5, 1973

[21] Appl. No.: 348,247

Related U.S. Application Data

[63] Continuation-in-part of Ser. No. 212,037, Dec. 27, 1971, abandoned.

[52] U.S. Cl. .............................. 324/127, 324/133
[51] Int. Cl. .......................... G01r 1/24, G01r 19/16
[58] Field of Search........ 324/127, 107, 108, 123 R, 324/133

[56] References Cited
UNITED STATES PATENTS

| | | | |
|---|---|---|---|
| 894,620 | 7/1908 | Frank................................. | 324/127 |
| 1,571,224 | 2/1926 | Allcutt.............................. | 324/108 |
| 2,129,524 | 9/1938 | Camilli.............................. | 324/127 |
| 3,155,903 | 11/1964 | Petzinger.......................... | 324/107 |
| 3,684,955 | 8/1972 | Adams............................... | 324/127 |

*Primary Examiner*—Alfred E. Smith
*Assistant Examiner*—Ernest F. Karlsen
*Attorney, Agent, or Firm*—Molinare, Allegretti, Newitt & Witcoff

[57] ABSTRACT

The disclosure describes apparatus for detecting the flow of electrical current in a conductor comprising a primary coil and a secondary coil that are magnetically coupled by a core preferably having a hysteresis coefficient of about 0.138 and a resistivity coefficient of about 1.915 ohms per centimeter. A differential amplifier is connected to the secondary coil in order to detect the flow of current, and means are connected to the differential amplifier output for visually or audibly indicating the detected flow of electrical current.

3 Claims, 5 Drawing Figures

PATENTED DEC 24 1974  3,857,096
SHEET 1 OF 2
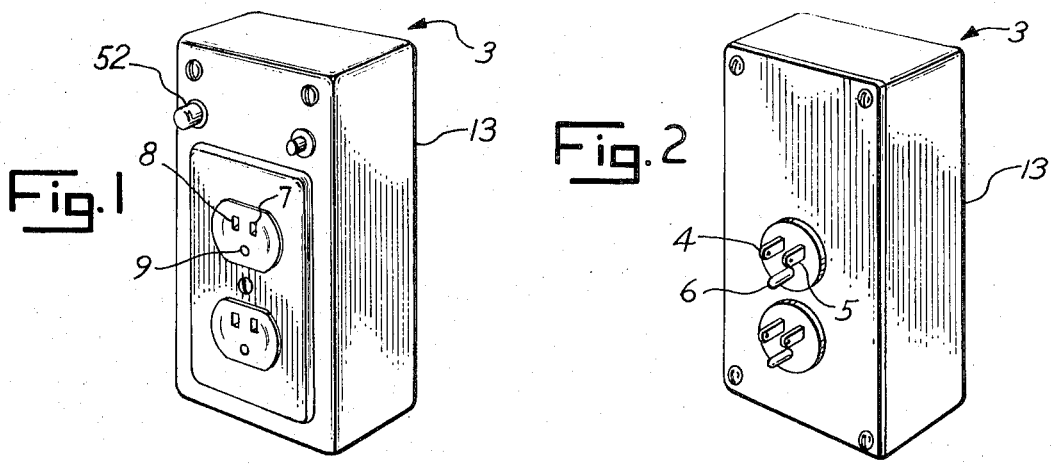
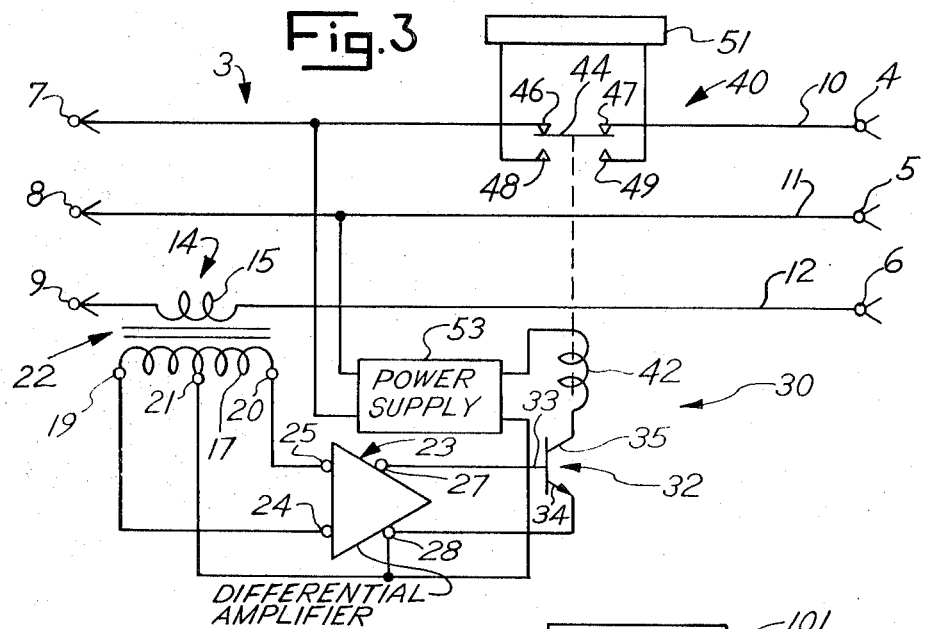
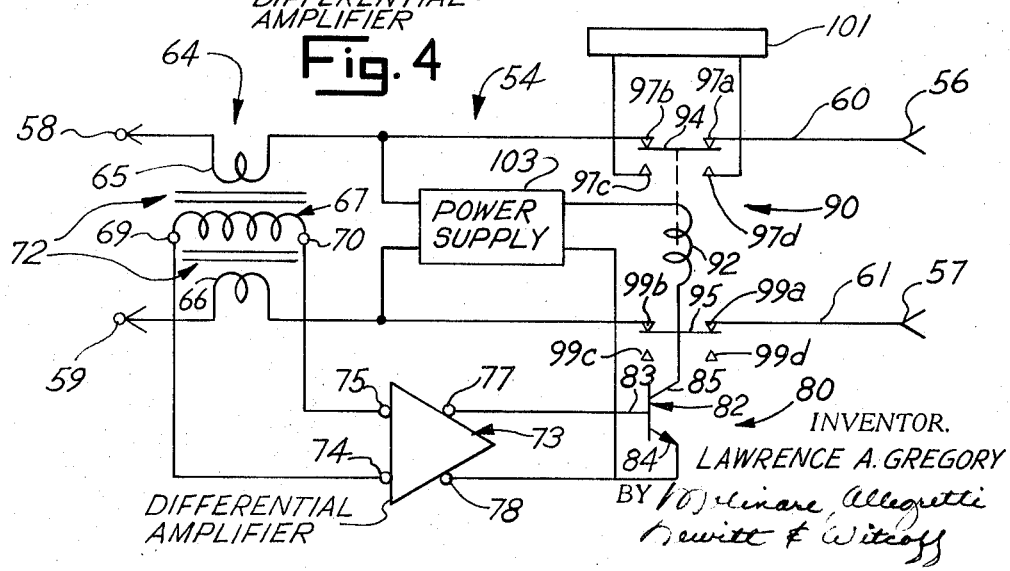
INVENTOR.
LAWRENCE A. GREGORY
BY Molinare Allegretti
Hewitt & Witcoff
ATTORNEYS

ELECTRICAL CURRENT LEAKAGE DETECTOR

RELATED APPLICATION

This is a continuation-in-part of U.S. application Ser. No. 212,037, now abandoned, enitled "Leakage Detector," filed Dec. 27, 1971 in the name of the above-identified applicant.

BACKGROUND OF THE INVENTION

This invention relates to alternating current sensing devices, and more specifically relates to such devices in which the presence of current is detected by the use of coils that are magnetically coupled together by a core material.

Experience has shown that under certain conditions, human beings may suffer shocks from relatively small amounts of leakage currents or ground faults in an electrical wiring system. Although the amount of current required to give a normal, healthy person a shock may be as high as ten milliamperes, it has been found that patients with various heart and cardiovascular conditions can receive a harmful shock from only twenty microamperes of current. Hospitals in particular have found that defects in wiring are sufficiently common to require the use of indicating devices which will detect the presence of leakage currents. Such devices must be able to detect the presence of a one milliampere leakage current in noncritical areas, a 50 microampere leakage current in more critical areas, such as child care facilities, and a twenty microampere leakage current in operating surgical facilities.

Certain devices have been devised in the past in order to detect such minute leakage currents. However, each of them has exhibited certain deficiencies that have limited their overall usefulness.

One such type of device is an impedance bridge detector. Although this device is rather sensitive, ground faults are inherently created by the bridge elements of the device, and only one polarity of fault electromotive force angle can be detected. Balanced ground faults cannot be detected, and, in the dynamic type of impedance bridge detector, large electromotive forces are induced between the isolated system and the ground through large impedance.

Another type of existing device is a current transformer detector. This type of device provides excellent ground circuit isolation, but it is deficient in its ability to detect direct current faults except transient phases, and it has relatively poor sensitivity.

Another type of existing device is a common mode voltage detector. Although this device is relatively sensitive, it creates a ground fault, since it must sense a voltage across a known value of resistance to determine the leakage current.

SUMMARY OF THE INVENTION

Applicant has discovered that the deficiencies of the prior art devices may be overcome by providing a device which senses current directly, translates it into a voltage proportional to the sensed current electromagnetically, and which drives a differential amplifier that operates an indicating device. Apparatus of the foregoing type is relatively small, portable, and easy to install, and it is capable of detecting extremely minute amounts of electrical current.

According to a principal feature of the invention, the apparatus comprises a primary coil connected in series with a conductor, a secondary coil, and a core means for magnetically coupling the primary coil and the secondary coil. A differential amplifier is connected to the secondary coil, and means are connected to the differential amplifier output for indicating the flow of electrical current in the conductor.

Applicant has found that the unique properties of the apparatus are drastically enhanced if the core means comprises an alloy of nickel and iron in which the ratio of the hysteresis coefficient to the resistivity coefficient ($K_Q/K_R$) is 0.03 or greater. By utilizing such a core means, the overall apparatus may be made more compact and portable, and its performance significantly improved.

By using the foregoing techniques, applicant has been able to build a device which will detect 20 microamperes of current by using a secondary coil having only 500 turns and a primary coil having only 152 turns. By using these techniques, a current leakage detector may be manufactured that is smaller, more portable, more economical and more accurate than the analogous prior art detectors.

DESCRIPTION OF THE DRAWINGS

These and other advantages and features of the present invention will hereinafter appear for purposes of illustration, but not of limitation, in connection with the accompanying drawings in which like numbers refer to like parts throughout and in which:

FIG. 1 is a front perspective view of an electrical current leakage detector made in accordance with the present invention;

FIG. 2 is a rear perspective view of the apparatus as shown in FIG. 1;

FIG. 3 is an electrical schematic diagram of the preferred embodiment of the present invention connected in the common mode;

FIG. 4 is an electrical schematic diagram of another embodiment of the invention connected in a differential mode.

DESCRIPTION OF THE PREFERRED EMBODIMENTS

Figure 5:
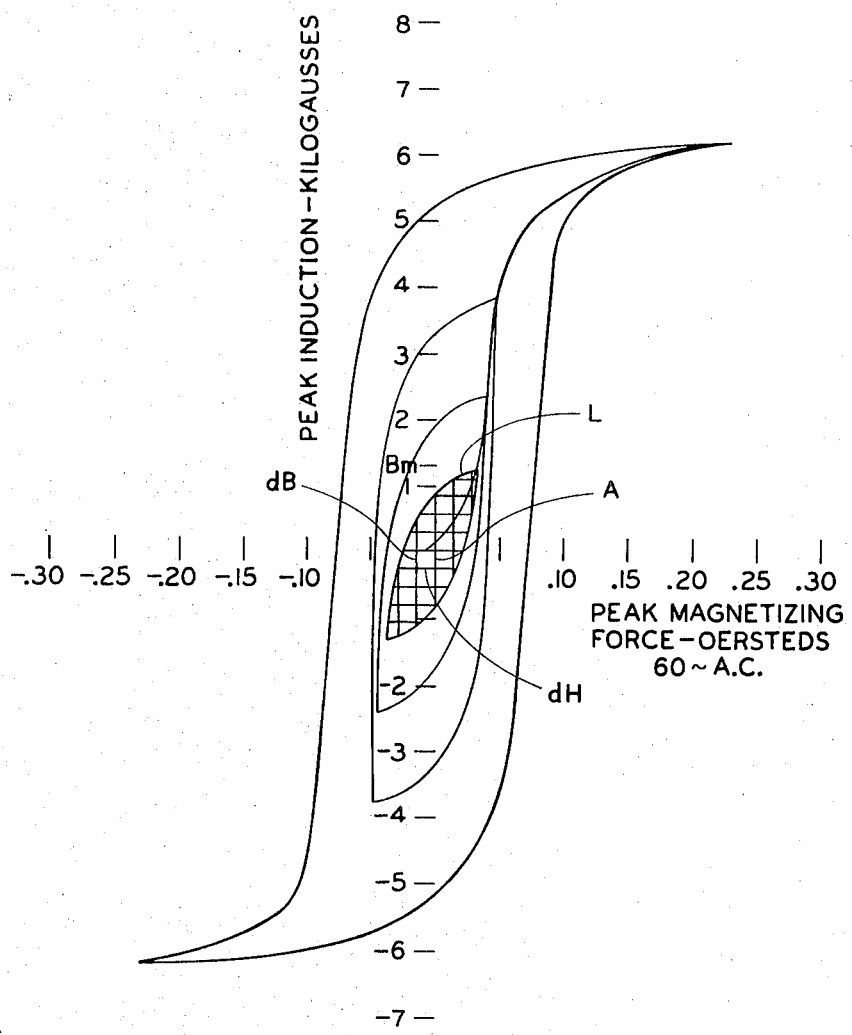
FIG. 5 is a family of hysteresis loops which illustrate the method by which magnetic material suitable for use in the invention can be selected.

Referring to FIG. 3, a preferred form of the present invention basically comprises a wiring and case assembly 3, a sensor assembly 14, a differential amplifier 23, an indicator assembly 30, and a power supply 53.

More specifically, wiring and case assembly 3 comprises terminals 4, 5 and 6 which may be arranged in the form of a conventional male three-terminal wall plug (FIG. 2) that can be connected to a conventional source of 120 volt, 60 Hz. power. Assembly 3 also comprises additional terminals 7, 8 and 9 that may be fabricated in the form of a conventional female three terminal wall socket (FIG. 1) to which additional equipment may be connected. Assembly 3 further comprises conductors 10, 11 and 12 which connect the foregoing terminals in the manner shown, together with a protective, non-conductive case 13 (FIGS. 1 and 2) that encloses the additional parts of the system.

Sensor assembly 14 comprises a primary coil 15, and a secondary coil 17 to which is connected output terminals 19, 20 and a center tap terminal 21. Coils 15 and 17 are magnetically coupled by a core 22.

Applicant has found that the performance of the apparatus may be drastically increased by utilizing a core comprising an alloy of nickel and iron in which the ratio of the hysteresis coefficient to the resistivity coefficient is 0.03 or greater. In the preferred embodiments, the core comprises an alloy of nickel and iron having a hysteresis coefficient of about 0.138 and a resistivity coefficient of about 1.915 ohms per centimeter. By using this material, applicant has been able to build a detector which will detect twenty microamperes of leakage current when the secondary coil employs only 500 turns and the primary coil employs only 152 turns. In this embodiment, the ratio of the core material magnetic circuit cross-sectional area to the core material magnetic circuit mean path length is 0.1. In addition, by using the foregoing techniques, a differential amplifier having an input impedance of about 25,000 ohms at an input current of 2 microamperes can be utilized. This is an important feature, since most commonly-avialable and inexpensive differential amplifiers have these input characteristics.

Differential amplifier 23 has inputs 24 and 25 that are connected to output terminals 19 and 20 respectively. The differential amplifier also has an output connection 27 and a reference potential input 28 that are connected to indicator assembly 30 as shown. As previously described, any conventional differential amplifier having an input impedance of about 25,000 ohms at an input current of about 2 microamperes may be utilized.

Indicator assembly 30 comprises a conventional transistor 32 having a base 33, an emitter 34 and a collector 35. The transistor operates a relay 40 that comprises a coil 42, a switch arm 44, and contacts 46, 47, 48 and 49. Contacts 48 and 49 are connected to a conventional alarm circuit 51 that operates an indicator bulb 52 located in case 13 (FIG. 1). Other alarm devices such as bells or horns may also be utilized. Power for the entire apparatus is supplied by a power supply 53 in a conventional manner.

Whenever a current of 20 microamperes or greater flows in the protected ground conductor 12, the current is sensed by primary coil 15 and is translated into a voltage proportional to the current electromagnetically through secondary coil 17 and core 22. The voltage drives differential amplifier 23 which detects the presence of the current and switches transistor 32 to its conducting state. The resulting current flowing in coil 42 causes switch arm 44 to move from the position shown into contact with contacts 48, 49 so that alarm circuit 51 is energized and bulb 52 is lighted.

Referring to FIG. 4, another embodiment of the invention connected in a differential mode is described. This embodiment of the invention basically comprises a wiring and case assembly 54, a sensor assembly 64, a differential amplifier 73, an indicator assembly 80, and a power supply 103.

More specifically, wiring assembly 54 comprises terminals 56 and 57 that may be connected to a conventional source of 120 volt, 60 Hz. electrical power. The wiring assembly also comprises terminals 58 and 59 that may be connected to additional equipment to be operated. Conductors 60 and 61 interconnect the terminals shown in FIG. 4.

Sensor assembly 64 comprises primary coils 65 and 66 that are connected in series with conductors 60 and 61, respectively. A secondary coil 67 is magnetically coupled to the primary coils by a core 72. The secondary coil also comprises terminals 69 and 70.

Differential amplifier 73 comprises inputs 74 and 75 that are connected to output terminals 69 and 70, respectively. The amplifier also comprises an output connection 77 and a reference potential input 78 that are connected to indicator assembly 80 as shown.

Indicator assembly 80 comprises a conventional transistor 82 having a base 83, an emitter 84, and a collector 85. The transistor drives a relay 90 comprising a coil 92, switch arms 94, 95 and contacts 97a–97d and 99a–99d. Contacts 97c and 97d are connected to a conventional alarm circuit 101.

A conventional power supply 103 provides power to the entire apparatus.

The operation of the embodiment shown in FIG. 4 may be understood with reference to the embodiment shown in FIG. 3. Basically, the voltage induced in secondary coil 67 is proportional to the difference in current flowing in conductors 60 and 61. This voltage difference is detected by the differential amplifier and is used to operate the indicator assembly in the manner previously described. It will be noted that when relay coil 92 is energized, switch arms 94, 95 interrupt both lines 60 and 61. The same type of relay could be used to interrupt lines 10–12 of the FIG. 3 embodiment. This technique is necessary for certain applications in which safety requires the interruption of all conductors in a wiring system.

In order to produce a detector of optimum sensitivity, the applicant has discovered that the core material must have a particular range of ratios of hysteresis coefficient to resistivity coefficient, and that these parameters can be determined in the following manner. Referring to FIG. 5, the hysteresis and resistivity coefficients are determined by a combination of graphical and mathematical means from the minor B-H loop curves of the core material. These coefficients relate the physical dimensions of the material, i.e., area, length and the number of conductor loops (turns) of the surrounding windings to equivalent circuit impedances for use in the calculations of external circuit parameters. The basic method is to determine core losses at a specific operating flux density and to equate these losses to an $E^2/R$ equation using the operating flux density and frequency to determine the voltage absorbed.

Referring to FIG. 5, 60 cycle current is passed through a coil wound around a sample of the core material. The flux density and magnetizing force are then measured and plotted to create a minor loop B–H curve, such as loop L, of the material at a desired operating flux density.

The minor loop is divided into areas, such as area A, each with sides dB and dH. For example, inner loop L has approximately 24 areas like area A in which dB=278 gausses and dH=0.014 oersteds. The number of areas are counted in order to determine core loss ($K_C$) according to the equation $K_C$ = number of areas $\times$ dB $\times$ dH $\times f \times 10^{-7}/8\pi$ where $f$ equals the frequency of the exciting current. For loop L:

$$K_C = 24 \times 278 \times 0.014 \times 60 \text{ (Hz)} \times 10^{-7}/8 \pi$$

$$K_C = 223 \times 10^{-7} \text{ watts per cubic centimeter.}$$

Total core power loss can be expressed by multiplying $K_C$ times the cross sectional area of the core material (A) times the length of the core material (1). Total core power loss can also be expressed by the term $E^2/Re$ where E equals the voltage induced by the flux density in the turns of the coil, and Re equals equivalent resistance. According to Faraday's law, $E = 4.44\ BmANf \times 10^{-8}$ where Bm equals the maximum flux density of loop L and N equals the number of turns of wire wound around the core material per unit length. As a result, total core power loss $= K_cAl = E^2/Re = (4.44\ BmANf \times 10^{-8})^2/Re$ By solving for Re:

$$Re = (19.7 Bm^2 f^2 \times 10^{-16}/K_C)(AN^2/l)$$

Therefore, by definition, the resistivity coefficient (Kr) of the core material equals $19.7\ Bm^2 f^2 \times 10^{-16}/K_C$. For loop L, $Kr = 19.7 \times (1200)^2 \times (60)^2 \times 10^{-16}/223 \times 10^{-7} = 0.438$ ohms per centimeter.

After $Kr$ is calculated, the permeability (u o) of the core material is calculated from FIG. 5 by dividing the maximum flux density excursion of the minor loop (Bm) by the corresponding value for the magnetizing force, H.

Using the values obtained for $K_r$, $u_o$ and operating frequency, hysteresis coefficient ($K_Q$) is calculated by the following equation:

$$K_Q = (u_o K_m K_r)^2/(u_o K_m)^2\ K_r^2$$

where $$K_m = 0.8\pi^2 f \times 10^{-8}$$

It has been discovered that the sensitivity of the detector is remarkably increased when $K_Q/K_R$ is 0.03 or greater if the coefficients are calculated according to the foregoing method. One magnetic material which meets this criterion is Supermalloy manufactured by Arnold Engineering Company.

Those skilled in the art will recognize that the embodiments shown herein are merely exemplary of the preferred practice of the invention, and that various modifications and alterations may be made by those skilled in the art without departing from the spirit and scope of the invention.

What is claimed is:

1. A method of detecting the flow of electrical current having a predetermined frequency in a conductor by means of a primary coil, a secondary coil, core means, and a test coil, said method comprising the steps of:

placing the test coil around the core means;

passing an AC current having substantially the predetermined frequency through the test coil;

measuring the flux density and magnetizing force resulting from the passage of the AC current through the test coil to form a hysteresis loop;

determining the core loss resulting from the passage of the AC current through the test coil;

recording the maximum flux density, Bm, of the hysteresis loop;

calculatng the resistivity coefficient, Kr, of the core means by the equation $Kr = CBm^2 f^2/$core loss, where C equals a constant;

calculating the permeability, $u_o$, of the core means by dividing Bm by the corresponding magnetizing force indicated by the hysteresis loop;

calculating the hysteresis coefficient, $KQ$, of the core means by the equation $KQ = (u_o CfKr)^2/(u_o Cf)^2 + Kr^2$, where C equals a constant;

altering the core means until KQ/Kr is 0.03 or greater;

connecting the primary coil in series with the conductor;

magnetically coupling the secondary coil to the primary coil with the core means;

detecting the secondary voltage induced across at least a portion of the secondary coil due to the flow of current in the conductor; and providing an indication when the secondary voltage exceeds a predetermined value.

2. A method, as claimed in claim 1, wherein the step of altering the core means comprises the step of altering the core means until the hysteresis coefficient is about 0.138 and the resistivity coefficient is about 1.915 ohms per centimeter.

3. A method, as claimed in claim 1, wherein the predetermined frequency is about 60 cycles per second.

* * * * *